US006771608B2

(12) United States Patent
Tillotson

(10) Patent No.: US 6,771,608 B2
(45) Date of Patent: Aug. 3, 2004

(54) LINK TRACKING WITH A PHASED ARRAY ANTENNA IN A TDMA NETWORK

(75) Inventor: Brian Jay Tillotson, Kent, WA (US)

(73) Assignee: The Boeing Company, Chicago, IL (US)

(*) Notice: Subject to any disclaimer, the term of this patent is extended or adjusted under 35 U.S.C. 154(b) by 400 days.

(21) Appl. No.: 10/011,529

(22) Filed: Nov. 5, 2001

(65) Prior Publication Data

US 2003/0086386 A1 May 8, 2003

(51) Int. Cl.[7] .................... G01R 31/08; H04B 7/212
(52) U.S. Cl. .................... 370/252; 370/321; 342/81; 342/158; 455/63.1
(58) Field of Search ................... 370/332, 321, 370/255, 252, 347, 588; 342/157, 158, 81, 352, 357.01; 455/25, 69, 431, 562.1

(56) References Cited

U.S. PATENT DOCUMENTS

| | | | |
|---|---|---|---|
| 5,379,320 A | | 1/1995 | Fernandes et al. |
| 5,592,320 A | * | 1/1997 | Wissinger .................... 359/159 |
| 5,797,083 A | | 8/1998 | Anderson |
| 5,854,971 A | * | 12/1998 | Nagoya et al. ............. 455/126 |
| 6,708,019 B2 | * | 3/2004 | McLain et al. ............ 455/63.1 |
| 2001/0009861 A1 | | 7/2001 | Martin et al. |
| 2001/0022558 A1 | | 9/2001 | Karr, Jr. et al. |
| 2001/0046841 A1 | | 11/2001 | Hart et al. |

OTHER PUBLICATIONS

P.B. Kenington & D.J. Edwards; Tracking Receiver Design for the Electronic Beam Squint Tracking System in the Mobile Environment; Centre for Communications Research; Bristol BS8 1TR, U.K.; pp. 742–748; 1989 IEEE.

G.J. Hawkins & D.J. Edwards; Operational analysis of electronic tracking schemes; IEEE Proceedings, vol. 136, Pt. I, No. 3, pp. 181–188; Jun. 1989.

* cited by examiner

*Primary Examiner*—Duc Ho
(74) *Attorney, Agent, or Firm*—Harness Dickey & Pierce P.L.C.

(57) ABSTRACT

An apparatus and method for performing closed-loop beam pointing of a narrow beam at each one of a plurality of target nodes of a communication network, in accordance with a TDMA multiplexing scheme. The invention employs a process similar to coning to obtain a plurality of scan points for each target node. A signal strength of a signal received from each node is recorded and used by the invention to determine an optimal pointing direction relative to each node. This optimal pointing direction is updated repeatedly as each of the target nodes is scanned. The invention provides the accuracy of closed loop beam pointing to be employed with TDMA communication links, which in turn allows using larger PAA's with narrow beams, and thereby permitting higher data transfer rates to be realized over each communication link.

15 Claims, 4 Drawing Sheets

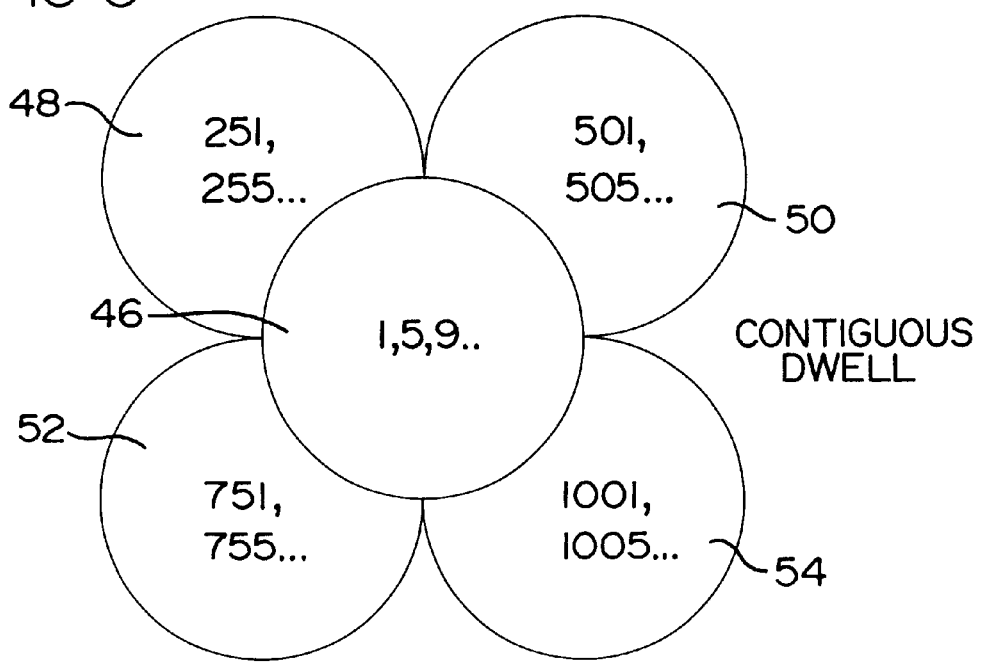
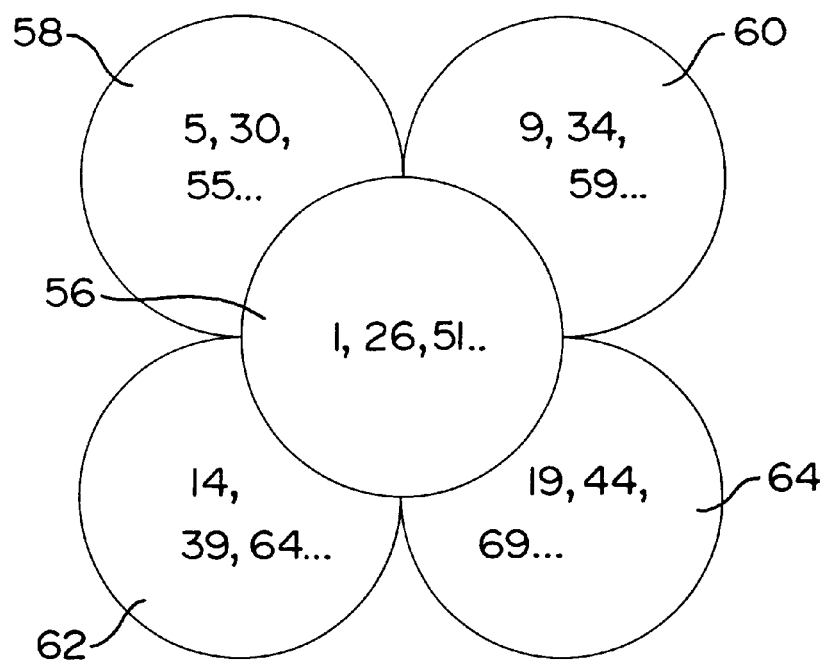

LINK TRACKING WITH A PHASED ARRAY ANTENNA IN A TDMA NETWORK

FIELD OF THE INVENTION

This invention relates to phased array antennas used in communication systems, and more particularly to an apparatus and method in which a phased array antenna is scanned or "hopped" among several nodes of a TDMA network in a manner which allows closed loop pointing of the antenna relative to each node.

BACKGROUND OF THE INVENTION

Forming and maintaining a communication link with an antenna, particularly a phased array antenna, having a narrow RF beam, is not a particularly easy task. For example, consider the problem of forming a communication link between two network nodes, node A and node B, where node A comprises a phased array antenna (PAA) and node B comprises a satellite dish based transponder, after they have agreed to form a communication link. Each node must further broadcast its location to all other nodes so that any node can compute the absolute direction to any other node.

The next step is determining which PAA covers the target node, in this example node B. For node A, this means estimating its own orientation in space and then using that orientation to compute the orientation of each PAA on the node, and finally assessing which PAA's field of regard encompasses node B. The next step is to point the selected PAA's beam at the target node. For the PAA which forms node A, this means computing the azimuth and elevation angles from the PAA boresight to node B. Finally, the signal is applied to the PAA of node A (for transmission) or to the demodulator thereof (for reception).

The steps described above constitute "open-loop pointing", that is, pointing the beam in the known direction of the target without using feedback to improve pointing accuracy. If the PAA beam is quite wide, for example, twenty degrees or more, then open-loop pointing may provide a sufficient level of accuracy. If the beam is narrow, however, open-loop pointing is often not sufficient to achieve the needed degree of pointing accuracy. Sources of pointing error include misalignment of the antenna mount on the vehicle, for example an aircraft; twisting of the vehicles structure between the PAA and an attitude sensor of the vehicle; lag time between a vehicle maneuver (e.g., a roll or turn) and the response from the attitude sensor; atmospheric refraction of the beam; and ionospheric scintillation for Earth-to-space links.

To compensate for the errors described above, closed-loop pointing is frequently used. With closed-loop pointing operations, the received beam is not pointed steadily at the target. Rather, it is continually re-pointed (i.e., scanned) in various directions angularly offset from the target to scan for the direction of the strongest reception. This is illustrated in FIG. 1. FIG. 1 illustrates a five-point scan pattern. Each circle represents a fraction of the width of the beam from an antenna such as a PAA. In the first scan (circle number 1), the beam is pointed in the direction that is estimated to give the strongest reception. In the second through fifth scans, the beam is pointed at directions that are angularly offset from the direction of the first scan point. The angular offsets are determined such that each of the four quadrants about the periphery of the first scan point is covered by one scan point.

At each of the above illustrated scan points, a link control system operably associated with the antenna being pointed measures the received signal intensity at each scan point. After five scans, it uses the five measurements to compute a new estimate of the optimal pointing direction. In the next scan cycle, the pattern will center on the newly determined optimal pointing direction. This process of scanning the beam around a central point is sometimes called "coning". Throughout the scan cycle, the link control system is not only measuring the signal strength but also passing the received signal to a demodulator associated with the antenna being pointed. That is, the link is transporting data while the controller maintains optimal pointing of the antenna.

The coning process described above is well known in the art. The specifics of how many points to use in the scan, how far apart they should be pointed (i.e., the angular offset), and how long each cycle should be are details decided to meet the needs of each application. Coning is well established for narrow-beam links where the beam tracks a single target for an extended period of time.

Until recently, narrow-beam antennas on mobile platforms, such as aircraft, could only be used for "continuous" links. By "continuous" it is meant those links where the RF beam points at a single target for an extended period of time. However, presently available PAA technology available from the Boeing Company allows a new type of RF link: the "point-and-shoot" TDMA (Time Division Multiple Access) link. In this scheme, a single PAA beam is rapidly "hopped" (i.e., scanned) among multiple targets (i.e. nodes). The advantage is that each platform gets most of the benefits of multiple high gain links (e.g. improved data rate, reduced interference and lower power consumption) without having to use multiple PAAs on the platform. This type of link is the enabling concept for several important projects of the Boeing Company which make use of a network incorporating of TDMA links involving PAAs to serve up to 200 or more mobile terminals.

When point-and-shoot TDMA links are implemented with small PAAs the beams are wide and there is little need for closed-loop pointing. However, for some platforms in planned military networks, large PAAs with narrow beams will be highly desirable. These high-gain PAAs would permit high data rates on communication links spanning many miles. Recent simulations conducted by the Boeing Company show that the use of TDMA links for a network making use of large PAAs can improve network throughput by 15–100% and reduce latency by about 25% compared to continuous links. For these long links, atmospheric refraction becomes a serious concern, so closed-loop pointing is required to maintain closure of each link.

In view of the foregoing, it would be highly desirable, then, to implement a closed-loop pointing system for use with an antenna operating as part of one node of a network having a large plurality of nodes, and which still can be used in a network requiring point-and-shoot TDMA links to allow the beam to be scanned (i.e. "hopped") rapidly between several nodes of the network.

SUMMARY OF THE INVENTION

The above and other objects are met by an apparatus and method for implementing closed-loop pointing of a beam of an antenna forming part of one node on a network having a large plurality of nodes, and where the beam is capable of being scanned from one node to another rapidly in accordance with a predetermined multiplexing sequence.

The method of the present invention involves assigning each node to specific slots of a repeating multiplexing sequence. In one preferred form, these slots form Time Division Multiple Access (TDMA) slots. For each node, several criteria are established. These criteria are: (1) an initial reported location for each node; (2) a desired number of scan points to be employed in determining the optimal pointing direction of an antenna of the system (representing part of one node) relative to a target node; (3) a center of scan (COS) field including azimuth and elevation information corresponding to the last-determined optimal pointing direction of the antenna relative to a given node; (4) a next scan point (NSP) field which defines a plurality of integers, wherein each integer is a representative of a unique pointing direction which is angularly offset from the last-determined optimal pointing direction for a given node, and wherein the plurality of scan points cooperatively represent a plurality of angularly offset pointing directions which circumscribe the last-determined COS information; and (5) a signal strength at last scan (SSLS) field for recording each one of a plurality of signal strength values determined for signals received by the antenna for a given one of the nodes, in correspondence with each one of the scan points, while the antenna is aimed at a given node.

The above information is used to allow the beam of the antenna to be rapidly scanned from one node to another in accordance with a TDMA multiplexing scheme, but which still enables closed-loop pointing of the beam at each node that the antenna has formed a communication link with during its scanning.

In performing the method of the present invention, the antenna is first aimed at a selected one of the nodes of the network in accordance with an initially reported location of the given node. The NSP value is then obtained. Information is then retrieved from the COS field which, at this point, represents an initially stored "optimal pointing direction" for the given node, and where this information allows the beam to be aimed at a center of the given node. Next, a unique translating function is used to generate azimuth and elevation coordinates for the retrieved scan point. The NSP field is then incremented and the antenna is pointed in accordance with the azimuth and elevation coordinates generated from the above-described unique translating function. The signal strength of a signal received from the target node is then recorded in a first sub-field of the SSLS field.

The above-described steps are repeated by retrieving the next scan point from the NSP field, again retrieving information stored in the COS field, again using a second unique translating function to generate azimuth and elevation coordinates for a second unique, angularly offset pointing direction corresponding to the second scan point, incrementing the NSP field, pointing the antenna in accordance with the azimuth and elevation coordinates generated from the second unique translating function, and recording the signal strength of the received signal. These steps are provided for each scan point until the last scan point in the NSP field has been used. The collective signal strength values stored in the SSLS field are then used in connection with a different, unique translating function to determine a new optimal pointing direction for the antenna which corresponds to the center of a given node. This new, optimal pointing direction is then stored in the COS field. When the above described steps are repeated, the new, optimal pointing direction information will be used from the COS field. In this manner, a new, optimal pointing direction will be determined each time all of the scan points in the NSP field have been used.

The above described operation is performed with respect to each node of the network that is targeted by the antenna. Since the present invention makes use of TDMA links, each node is assigned a time slot. The antenna (which is associated with one particular node) in one preferred implementation of the method, is directed at each node in accordance with that node's timeslot. Thus, the method of the present invention allows a large number of nodes to be addressed by any other node, substantially simultaneously, such that the above-described closed-loop pointing operation can be performed by the antenna associated with each one of a large plurality of nodes. The ability of the specific types of antennas, particularly, PAA's available from the Boeing Company, to scan from one target to another at rates of 10,000 times per second enables the method of the present invention to provide the needed closed-loop pointing accuracy substantially simultaneously to a large plurality of nodes.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 5 is a diagram of an alternative preferred scanning pattern employing contiguous dwell; and FIG. 6 is a diagram of an alternative interleaved scan pattern used for collecting signal strength information to determine an optimal pointing direction for a given node.

DETAILED DESCRIPTION OF THE PREFERRED EMBODIMENTS

The following description of the preferred embodiment(s) is merely exemplary in nature and is in no way intended to limit the invention, its application, or uses.

Figure 1:
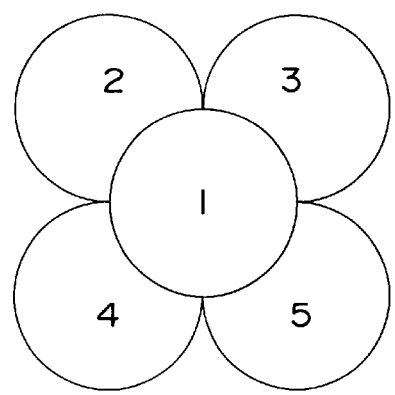
FIG. 1 is a simplified diagram of a prior art scan pattern used by a phased array antenna in determining a beam center of a target, wherein the target is designated by a "1" in the center circle.
Figure 2:
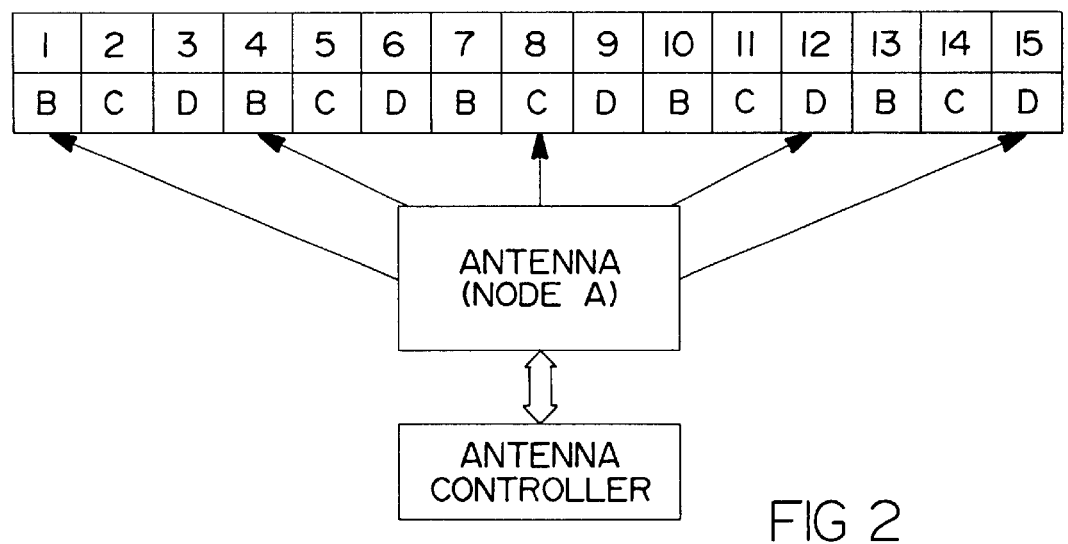
FIG. 2 is a simplified representation of a TDMA scheme employed by a preferred embodiment of the present invention.

Referring to FIG. 2, there is shown a simplified representation of a Time Division Multiple Access (TDMA) scheme in which a plurality of nodes, "B", "C" and "D", are assigned to various timeslots of the TDMA sequence. Thus, the antenna forming node A is aimed toward node B at each of TDMA slots 1, 4, 7, 10 and 13. The antenna of node A is aimed at node C at each of TDMA slots 2, 5, 8, 11, and 14. The antenna of node A is aimed at node D at each of timeslots 3, 6, 9, 12, and 15. However, it will be appreciated immediately that a greater or lesser plurality of timeslots could be established depending on the overall number of nodes incorporated into the communication network. In actual practice, it is anticipated that communication networks involving 200 or more nodes may be employed in some communication networks with which the present invention may be used. Thus, the illustration of only fifteen TDMA timeslots should be understood as representing a highly simplified TDMA sequence. Similarly, the use of only three distinct nodes should also be understood as being only for purposes of explanation, and that a greater number of nodes, often a few dozen or more, will be employed in most applications of the present invention.

For each node shown in FIG. 2, the present invention establishes several criteria. These criteria are:

Reported location: the latitude, longitude and altitude of the node;

Scan Points: the total number of scan points used in the determination of the optimal pointing direction to point the antenna at the target node;

Next Scan Point (NSP) field: a field for containing an integer representing the next scan point to be used in the process of determining the optimal pointing direction;

Center of Scan (COS) field: a field for containing the optimal pointing direction (i.e. azimuth and elevation angles) for the most recently determined optimal pointing direction; and Signal Strength at Last Scan (SSLS): a field for recording the signal strength of the signal received at each scan point, in a corresponding sub-field, field, during the process of obtaining the optimal pointing direction. These sub-fields may be denoted as "X1", "X2", "X3", "X4", and "X5". Each of these five sub-fields are used to record the signal strengths obtained at each one of the five scan points used by the method of the present invention.

With a conventional open-loop, point-and-shoot approach, the antenna of node A would point the PAA beam straight at the calculated position of each node B, C and D. For example, at timeslots 1, 4, 7, 10 and 13, node A would use the reported location of node B to compute its azimuth and elevation, then would point the PAA directly in accordance with those azimuth and elevation coordinates.

With the method of the present invention, however, node A is controlled in a different manner which allows the closed-loop, point-and-shoot approach to be employed. This approach will now be described in connection with the flow chart 10 of FIG. 3 which represents the steps performed by the present invention. For purposes of explanation, a description of operation will be provided for to determining the optimal pointing direction relative to node B. It will be appreciated that this operation is performed relative to each and every node making up the network.

Initially, the initial reported location of node B is obtained, as indicated, at step 12. Next, the Next Scan Point (NSP) value is obtained, as indicated, at step 14, together with the total number of scan points, as indicated in step 16. The NSP value is an integer which represents a particular angularly offset pointing direction relative to node B. Next, the Center of Scan (COS) information is obtained, as indicated, at step 18. Subsequently, the method of the invention uses a unique translation function to obtain the azimuth and elevation information (i.e., angles) necessary to point the antenna in a direction corresponding to the desired angular offset represented by scan point 1, as indicated at step 20. In one exemplary implementation, the COS information determines the unit vector $\underline{COS}$ pointing toward the estimated center of the target node, where underscore indicates a vector quantity. The angular offset represented by each scan point defines an azimuth offset $\Delta az$ and an elevation offset $\Delta el$ (both in radians in this example), where azimuth and elevation directions are defined relative to some reference direction defined by unit vector Z. An example of a suitable reference direction for Z is the local zenith direction. The unique translation function computes the azimuth change vector as:

$$\underline{\Delta az} = \Delta az(\underline{COS} \times \underline{Z}),$$

the elevation change vector as $$\underline{\Delta el} = \Delta el(\underline{\Delta az} \times \underline{COS})/|\underline{\Delta az} \times \underline{COS}|,$$

and the actual pointing direction SP for the scan point as $$\underline{SP} = \underline{COS} + \underline{\Delta az} + \underline{\Delta el}$$

where x indicates a vector cross product and |V| indicates the magnitude of vector V.

Figure 3:
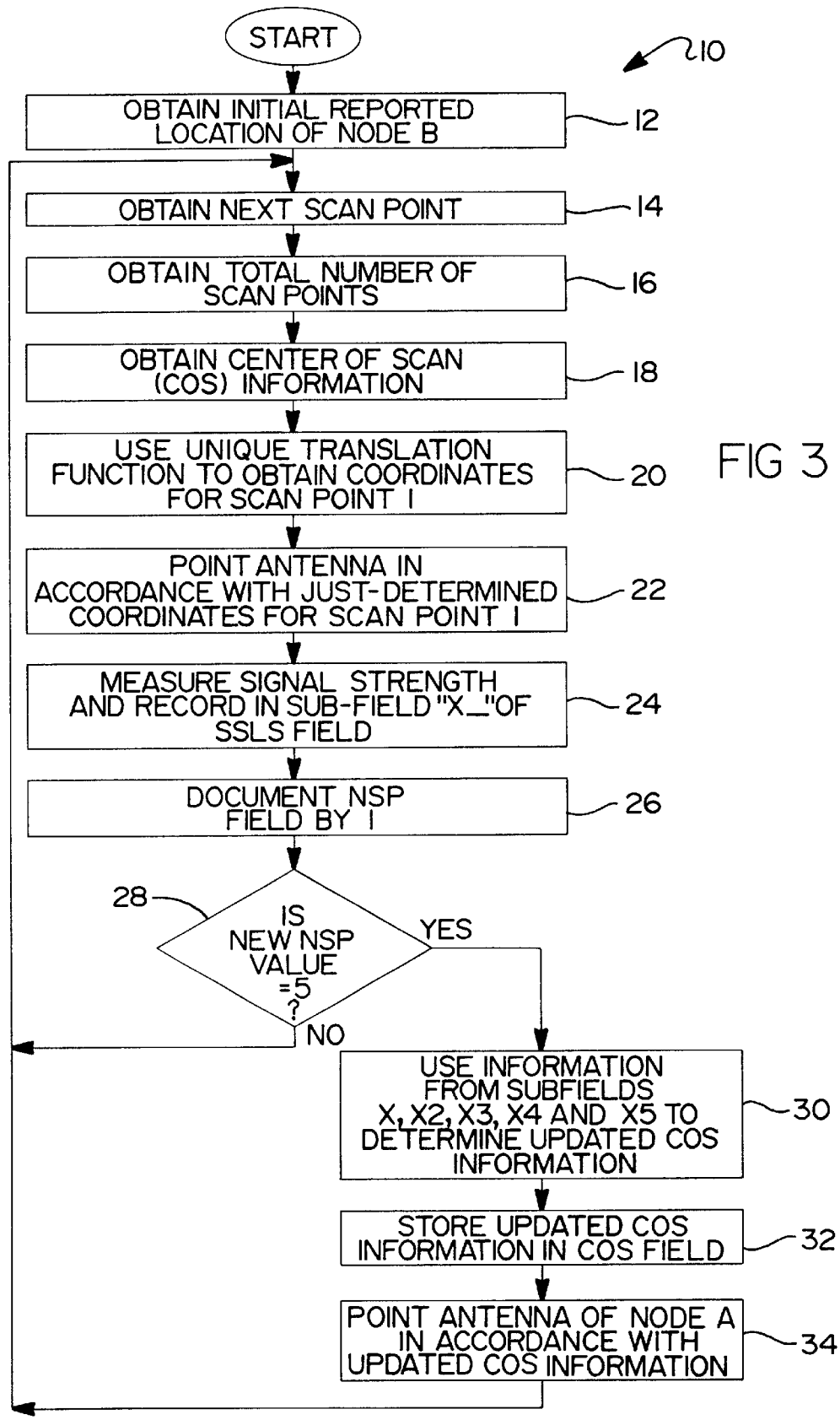
FIG. 3 is a flowchart of the steps performed by the present invention in implementing the closed loop, point and shoot beam centering approach.

With further reference to FIG. 3, the antenna of node A is then pointed in accordance with the just-determined coordinates for scan point 1, as indicated at step 22. While receiving a signal from node B, node A measures the signal strength and records it in sub-field X1 in the SSLS field, as indicated at step 24. Next, the NSP field is incremented by an integer value of one, as indicated at step 26. A check is then made to determine if the current NSP integer value is equal to five, which in this example is the last scan point. This check is indicated at step 28 of FIG. 3. If the check at step 28 indicates a "No" response, then the steps 14–28 are performed a second time with the newly obtained scan point. This is repeated until a "Yes" determination is made at step 28, whereupon the method then uses the signal strength values recorded in sub-fields X1, X2, X3, X4 and X5, in connection with a different function, to determine an updated optimal pointing direction, as indicated at step 30. The method then uses the signal strength values recorded in sub-fields X1, X2, X3, X4 and X5, in connection with a different function, to determine an updated optimal pointing direction, as indicated at step 30. This function computes the new pointing direction $\underline{COS}$ so as to minimize the sum of squared errors between the measured signal strength values X1, X2, X3, X4 and X5 and the predicted values at the five angular offsets from the center of the beam, given the shape of the beam. Specifically, for k signal strength measurements $X_i$ where "i" is in the range [1 ... k], and for a beam whose signal strength at various angular offsets relative to the beam center is given by a shape function $S(\Delta az, \Delta el)$, the function computes the new $\underline{COS}$ so as to minimize the formula:

$$\Sigma(X_i - S(\Delta az_i, \Delta el_i))^2$$

where the sum is over all values of i in [1 ... k], $\Delta az_i$ is the azimuth offset relative to the new $\underline{COS}$ for measured scan point i, and $\Delta el_i$ is the elevation offset relative to the new $\underline{COS}$ for measured scan point i.

The information obtained at step 30 is also stored in the COS field, as indicated at step 32. This updated COS information (representing an optimal pointing direction relative to node B) is then used to point the antenna of node A toward node B during the next loop through steps 18–22.

It will be appreciated that the above described operation for determining an optimal pointing direction relative to node B occurs only during TDMA timeslots 1, 4, 7, 10 and 13, as shown in FIG. 2. The same steps are performed with regard to node C at each of timeslots 2, 5, 8, 11 and 14. Likewise, the same steps are performed relative to node D at each of timeslots 3, 6, 9, 12 and 15. In the present example, at TDMA timeslot 1, the method obtains scan point 1 and performs the operations of steps 16–28 relative to scan point 1. At timeslot 4, the method performs the same steps but with scan point 2. At timeslot 7, the same steps are performed with scan point 3 and so forth until all five scan points have been used on each and every node. Thus, in this example, at timeslot 13, the method of the present invention would determine the updated COS information and point the antenna in accordance with this information.

The ability of a phased array antenna of the Boeing Company to be scanned from target to target at a rate of several thousand times per second enables the TDMA multiplexing sequence to be used to make a closed-loop determination of the optimal pointing direction relative to each node, substantially simultaneously, as the antenna beam is scanned from one target to another.

Figure 4:
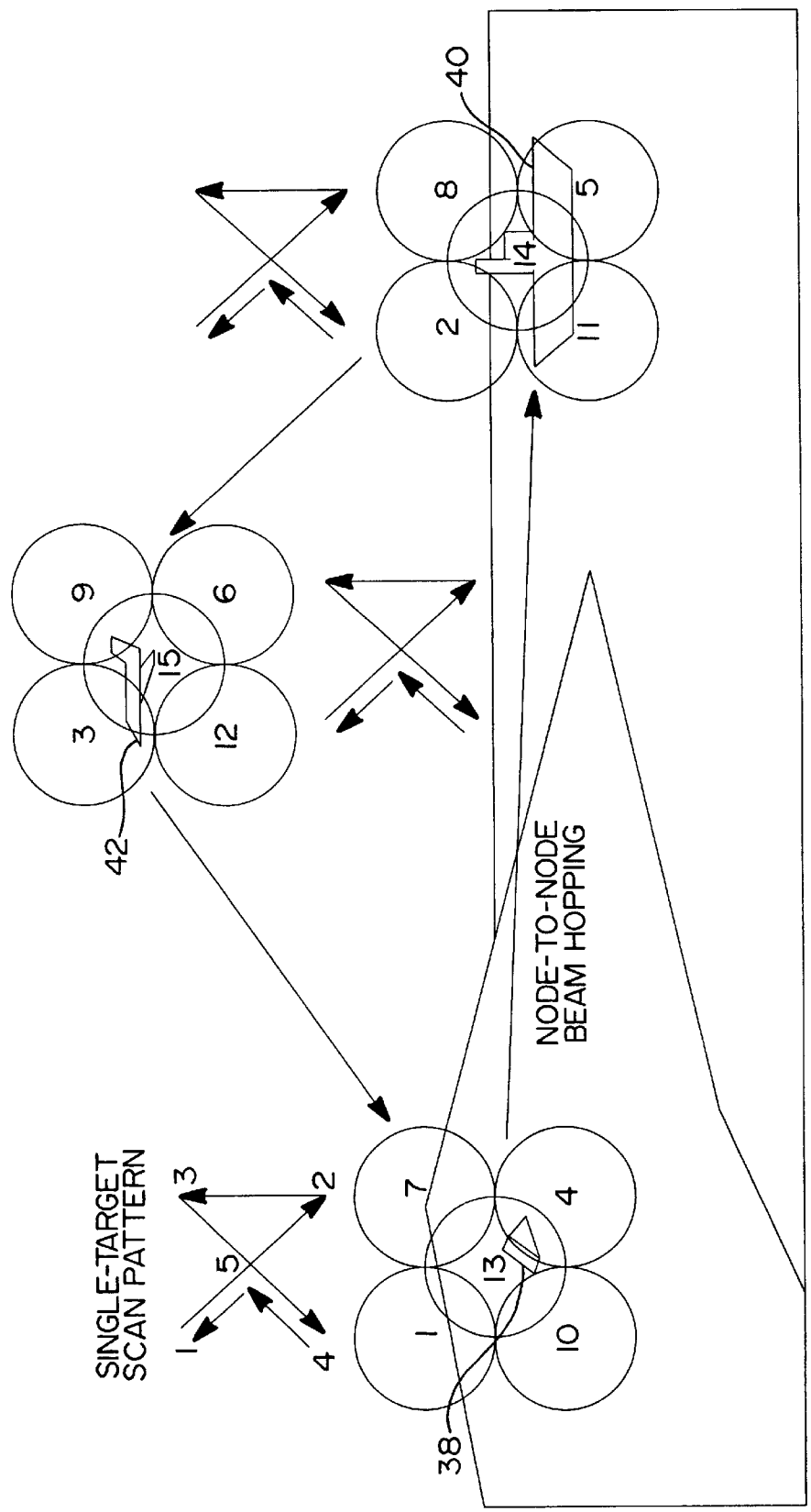
FIG. 4 is a simplified diagram of the scanning pattern illustrated in FIG. 1 being applied to with continuous links three different nodes of a communications network employing a land-based node, an airborne node in the form of an aircraft, and a sea-based node in the form of a ship.

Referring to FIG. 4, a representation of the above-described operation is illustrated wherein node B is shown as a land-based node 38, node C is illustrated as a sea-based ship 40 and node D is illustrated as an airborne platform in the form of an aircraft 42. With regard to land-based node 38, the circles denoted by "1", "4", "7", "10" and "13" represent the five scan points made relative to this node. The circles in the vicinity of ship 40, representing node C, denote the scan points taken at TDMA timeslots 2, 5, 8, 11 and 14. Similarly, the five circles relative to the aircraft 42 representing node D represent the scan points taken during TDMA timeslots 3, 6, 9, 12 and 15. The spatial pattern of the scan points about each of nodes 38, 40 and 42 is essentially the same as a conventional coning pattern used in closed loop pointing. The principal difference is that the duration of the scan pattern is extended by timesharing the beam via the TDMA multiplexing scheme among several communication links.

In general, the overall TDMA cycle is unlikely to have the same duration as the scan cycle in most applications. Either cycle could be longer than the other. In the example presented herein, each communication link repeats its scan every fifteen timeslots, but the TDMA cycle, in actual practice, could have 100 to 1000 or more time slots.

With reference to FIG. 5, in one alternative form the method of the present invention employs a scan cycle which involves multiple samples being taken at each scan point in an effort to improve the sampling statistics. For example, each scan point might be sampled 50 times before new COS information is computed. In this example, each one of the X1, X2, X3, X4 and X5 sub-fields would include 50 samples which would be summed together to produce a final value which would be stored in each of these sub-fields. If 50 samples are taken at each scan point, then in this example where five scan points are employed, 250 samples would be required to update one communication link with a node. 750 timeslots would be needed to update all three communication links (i.e. links to each of nodes B, C and D), yet the overall TDMA cycle might be only 100 timeslots long.

A further variation to the above described scanning sequence could involve taking multiple samples at each scan point and gathering all the samples for a given scan point before moving to the next scan point. This scanning pattern can be termed a "contiguous dwell" pattern. Thus, the scanning pattern illustrated in FIG. 5 could comprise sampling scan point 1, represented by center circle 46, at each one of a number of timeslots before moving to sample scan point 2, represented by circle 48, for a similar or different number of samples. All of the samples would be taken relative to scan point 2 before moving on to scan point 3, represented by circle 50, wherein all of the samples would be taken for this scan point before moving on to scan point 4, represented by circle 52. All of the samples would then be taken for scan point 4 before finally moving to scan point 5, represented by circle 54. All of the samples for scan point 5 would then be collected before repeating scan point 1.

FIG. 6 illustrates yet another alternative scanning pattern which could be termed an "interleaved" scan pattern. With this scanning pattern, each scan point is sampled once before returning to sample a particular scan point again. Thus, each of the five scan points represented by circles 56, 58, 60, 62 and 64 are sampled once before a second sample is taken for any given scan point. Thus, for scan point 1 (circle 56), a first sample would be taken at TDMA timeslot 1, a second sample at timeslot 26, a third sample at timeslot 51, and so forth until the desired number of samples have been collected. This sampling would be "interleaved" with each of the four other scan points (represented by circles 58–64). Thus, the collection of the desired number of samples for each of the scan points would be finished in successive fashion, one scan point after another, with this form of scanning pattern. It will also be appreciated that a "hybrid" scanning pattern could be used to blend these two alternative scanning patterns. For example, a mixed scan pattern might dwell for ten contiguous samples at each scan point and repeat that cycle five times before updating the Center of Scan (COS) information field with new optimal pointing direction information. A scan pattern might even take more samples at some scan points than at others.

With the present invention, it will be appreciated that there is a trade off between the number of TDMA links per beam (i.e. the number of nodes among which the beam is hopped), the width of the beam, and the response time of the link tracker. The narrower the beam, the smaller the pointing error that can cause the beam to miss the target. Pointing disturbances do not occur instantly. For example, if a node A aboard an airplane flies from a dry layer of air into a wetter one, the beam to node B may begin to refract differently than when node A was in the dry layer. Ultimately the beam may need to point five degrees from its original direction in order to maintain the link with node B. However, this change takes time. If the transition from one beam pointing condition to the other takes twenty seconds and the PAA beam is eight degrees wide (four degrees from beam center to first null), then several seconds will elapse before the beam is seriously mispointed. Unless the beam is shared among many dozens of nodes, the present invention can update the center-of-scan fast enough to keep the beam on target to all the nodes. However, if the beam is only 0.5 degrees wide and the refractive change occurs in only five seconds, the refractive change could cause the beam to miss its targets in only a few hundred milliseconds. If this narrow beam is shared among more than a few nodes, the scan pattern for each node will take so long that the beam will completely miss its targets before the scan pattern is complete.

The present invention thus provides a means for providing closed looped pointing accuracy to TDMA communication links to thus significantly increase the throughput of each one of the links of a communication network. The invention provides the increased throughput with the ability to scan an antenna beam among a large plurality of target nodes of the network. The use of closed-loop tracking further allows large PAA with narrow beams to be employed, which therefore permit higher data rates over longer communication links than would otherwise be possible with small PAA.

It is further conceivable that the apparatus and method of the present invention could be employed, for example, in an underwater communications system based on acoustic or optical beams rather than RF beams. For example, the method and apparatus of the present invention could be adapted for use in networking autonomous underwater vehicles (AUVs) operating underwater.

It will also be appreciated that the invention is not limited to use with pure TDMA schemes. For example, Code Division Multiple Access (CDMA) or Frequency Division Multiple Access (FDMA) multiplexing schemes could conceivably be employed in addition to a TDMA scheme to suit the needs of a given application.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for closed-loop pointing of a beam transmitted by an antenna, wherein the beam is required to be scanned from one to another of a plurality of targets each defining a node of a communication network, and in accordance with a multiplexing sequence, the method comprising the steps of:
    a) assigning each node to specific slots of said multiplexing sequence;
    b) defining a number of scan points to be used in determining a center of a designated one of said nodes;
    c) aiming said antenna at one of a predetermined plurality of angularly offset locations relative to an initially recorded position of said designated node;
    e) recording a signal strength value of a signal received from said designated node;
    f) repeating steps c) through e) until a plurality of signal strength values have been recorded corresponding to each of said angularly offset locations relating to said designated node;
    g) extrapolating from said plurality of signal strength values and said initially recorded position of said designated node an updated location of a center of said designated node; and
    h) aiming said antenna at a new position, relative to said designated node, in accordance with said updated location determined in step g).

2. The method of claim 1, further comprising the step of repeating steps b) through h) for each node of said communication network in accordance with said multiplexing sequence.

3. The method of claim 1, further comprising the step of using a translation function to extrapolate, from said updated location of said center of said designated node, a new plurality of angularly offset locations, when step c) is repeated.

4. A method for performing closed-loop pointing of a beam transmitted by an antenna, wherein the beam is required to be scanned from one to another of a plurality of targets each defining a node of a communication network, in rapid succession, and in accordance with a repeating multiplexing sequence, the method comprising the steps of:
    a) assigning each node to specific slots of said repeating multiplexing sequence;
    b) for at least one of said nodes, establishing the following:
        an initial reported location thereof;
        defining a number of scan points to be used in determining a center of said one node;
        a center of scan (COS) field including information needed to aim said antenna at a center of said one node;
        a next scan point (NSP) field defining a predetermined number of scan points, wherein said scan point represent a corresponding plurality of pointing direction offsets, in a predetermined angular orientation, from a previously determined center of said one node;
        a signal strength at last scan (SSLS) field for recording signal strength values determined at each of said scan points;
    c) retrieving said next scan point;
    d) retrieving said information from said COS field;
    e) using a unique translating function to generate, from said next scan point and said information obtained from said COS field, pointing information needed to point said antenna in accordance with said pointing direction offset;
    f) incrementing said NSP field;
    g) pointing said antenna in accordance with said pointing information obtained in step f);
    h) recording a signal strength of a signal received from said one node;
    i) repeating steps c) through h) until signal strength information has been obtained for each of said scan points; and
    j) using said signal strength information obtained for each of said scan points to determine a new center of said one node.

5. The method of claim 4, further comprising the step of re-pointing said antenna in accordance with said new center of said one node determined in step j).

6. The method of claim 4, further comprising the step of storing said new center of said one node in said COS field.

7. The method of claim 4, further comprising the step of repeating steps b) through j) for each one of said nodes in accordance with said multiplexing sequence.

8. The method of claim 4, further comprising the step of repeating step h) a plurality of times and obtaining an approximation of said signal strength from said plurality of recordings before proceeding to step i).

9. The method of claim 4, further comprising the step of defining different numbers of scan points for different ones of said nodes.

10. The method of claim 4, wherein said scan points are integers representing said pointing direction offsets.

11. The method of claim 4, wherein step f) comprises incrementing said NSP field by an integer value of one.

12. A method for closed-loop pointing of a beam transmitted by an antenna, wherein the beam is required to be scanned from one to another of a plurality of targets each defining a node of a communication network, in rapid succession, and in accordance with a repeating multiplexing sequence, the method comprising the steps of:
    a) assigning each node to specific slots of said repeating multiplexing sequence;
    b) for each node, establishing the following:
        an initial reported location thereof;
        a number of scan points field;
        a center of scan (COS) field including azimuth and elevation information needed to aim said antenna at a center of a selected node;
        a next scan point (NSP) field defining one of a plurality of next scan point integers, wherein each said NSP integer is representative of one of a unique pointing direction for said antenna which is offset from a pointing direction presently defined by said azimuth and elevation information recorded in said COS field, and wherein said plurality of NSP integers further represent a plurality of offset pointing directions circumscribing said pointing direction presently defined by said azimuth and elevation information in said COS field;

a signal strength at last scan (SSLS) field for recording each one of a plurality of signal strength values determined for signals received by said antenna from a given one of said nodes, in correspondence with each one of said NSP integers of said NSP field, while said antenna is aimed at said one node;

c) retrieving a NSP integer for a selected one of said nodes;

d) retrieving said azimuth and elevation information presently stored in said COS field;

e) using one of a plurality of unique translating functions to generate azimuth and elevation coordinates for said unique pointing direction corresponding to said NSP integer; for said selected node f) incrementing said NSP integer; for said selected node g) pointing said antenna in accordance with said azimuth and elevation coordinates generated at step e);

h) recording a signal strength of a signal received from said selected node in said SSLS field while said antenna is pointed in accordance with said coordinates used in step g);

i) repeating steps c) through h) until signal strength information has been collected for each of said NSP integers used in said NSP field;

j) from said signal strength information recorded in relation to each of said NSP integers of said NSP field in step I), extrapolating new azimuth and elevation information representing a new determination of said center of said selected node and storing this information in said COS field in place of previously recorded information.

13. The method of claim 12, wherein step h) is performed a plurality of times before proceeding to step i).

14. The method of claim 12, further comprising the step of repeating steps c) through j) for every one of said nodes in accordance with said multiplexing sequence.

15. An antenna system for communicating with a plurality of nodes of a communication network in accordance with a multiplexing scheme, wherein said antenna system forms one of said nodes, said system comprising:

an antenna;

an antenna control system for aiming a beam of said antenna at desired azimuth and elevation angles;

said antenna operating to:

scan each one of said nodes wherein each of said nodes is assigned to a specific slot of said multiplexing scheme, and to obtain a signal strength value of a signal received from each one of said nodes at each one of a plurality of scan points representing angularly offset locations relative to a predetermined center location of each of said nodes;

record each one of said signal strength values;

from said recorded signal strength values and said predetermined center location of each of said nodes, determine an updated center location for each of said node;

aiming said antenna at each of said nodes in accordance with said updated center location of each of said node, such that a closed loop system is formed for repeatedly determining a center location of each of said nodes and re-aiming said antenna at each of said nodes as said beam of said antenna is hopped successively from one node to another of said nodes in accordance with said multiplexing scheme.

* * * * *